United States Patent
Riesop

(10) Patent No.: US 9,771,493 B2
(45) Date of Patent: *Sep. 26, 2017

(54) CAN PRETREATMENT FOR IMPROVED COATING ADHESION

(71) Applicant: Henkel AG & Co. KGaA, Duesseldorf (DE)

(72) Inventor: Joerg Riesop, Kerpen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,076

(22) Filed: May 1, 2015

(65) Prior Publication Data

US 2015/0232698 A1    Aug. 20, 2015

Related U.S. Application Data

(63) Continuation of application No. PCT/EP2014/050191, filed on Jan. 8, 2014.

(51) Int. Cl.
| | |
|---|---|
| *C23C 22/34* | (2006.01) |
| *C09D 179/08* | (2006.01) |
| *C23C 22/36* | (2006.01) |
| *C23C 22/83* | (2006.01) |
| *C08K 3/16* | (2006.01) |
| C23C 22/07 | (2006.01) |
| B21D 22/20 | (2006.01) |
| B21D 51/26 | (2006.01) |

(52) U.S. Cl.
CPC ............ *C09D 179/08* (2013.01); *C08K 3/16* (2013.01); *C23C 22/34* (2013.01); *C23C 22/361* (2013.01); *C23C 22/83* (2013.01); B21D 22/201 (2013.01); B21D 51/26 (2013.01)

(58) Field of Classification Search
CPC ....... C23C 22/361; C23C 22/34; C23C 22/36; C23C 22/56
See application file for complete search history.

(56) References Cited

U.S. PATENT DOCUMENTS

| | | | |
|---|---|---|---|
| 2,327,885 A | 8/1943 | Grace et al. | |
| 4,273,592 A | 6/1981 | Kelly | |
| 4,859,351 A | 8/1989 | Awad | |
| 4,992,116 A | 2/1991 | Hallman | |
| 5,378,379 A | 1/1995 | Bershas | |
| 6,040,280 A | 3/2000 | Kelly et al. | |
| 6,190,738 B1 * | 2/2001 | Beck | C10M 173/025 134/26 |
| 6,802,913 B1 | 10/2004 | Goodreau et al. | |
| 2007/0231496 A1 * | 10/2007 | Eriksson | C23C 22/34 427/407.1 |
| 2009/0297843 A1 | 12/2009 | Sitthichai et al. | |
| 2010/0260953 A1 | 10/2010 | Tadaki et al. | |

FOREIGN PATENT DOCUMENTS

| | | |
|---|---|---|
| DE | 202006005671 U1 | 7/2006 |
| DE | 102005027633 A1 | 12/2006 |
| EP | 0008942 A1 | 3/1980 |
| EP | 00008942 B1 | 6/1983 |
| EP | 0401565 A1 | 12/1990 |
| EP | 1642939 A2 | 4/2006 |
| WO | 0071626 A1 | 11/2000 |
| WO | 2007113141 A | 10/2007 |
| WO | 2007113141 A1 | 10/2007 |
| WO | 2008070040 A1 | 6/2008 |

OTHER PUBLICATIONS

International Search Report for PCT/EP2013/073324, mailed Feb. 11, 2014.
International Search Report for PCT/EP2014/050191, mailed Apr. 14, 2014.

* cited by examiner

*Primary Examiner* — Lois Zheng
(74) *Attorney, Agent, or Firm* — Mary K. Cameron

(57) ABSTRACT

The invention relates to the use of an acidic aqueous composition for pretreating cans, wherein an inorganic-organic conversion layer is formed in the course of the pretreatment, said conversion layer, as such, offering an excellent adhesive base for wax which improves sliding of the formed can and for the subsequent coating. The invention relates to a wet-chemical pretreatment method in which a can cylinder is first contacted with an acidic aqueous composition that contains water-soluble inorganic compounds of Zr, Ti, Si, Hf or Ce, and water-soluble polymers comprising carboxyl groups or hydroxyl groups; and subsequently is contacted with an aqueous wax dispersion. The invention further relates to an acidic aqueous composition suitable for the pretreatment method comprising water-soluble polymers selected from condensation products of glycoluril and aldehydes. The invention further relates to a method for producing can cylinders, said method including the pretreatment according to the invention.

15 Claims, No Drawings

CAN PRETREATMENT FOR IMPROVED COATING ADHESION

STATEMENT REGARDING FEDERALLY SPONSORED RESEARCH

NONE

The present invention relates to the use of an acidic aqueous composition for the pretreatment of cans, in the course of which an inorganic-organic conversion layer is formed, which, as such, offers an excellent adhesive base for the waxes that improve the sliding behavior of the shaped can sheet metal and for the subsequent coating. The invention comprises in this case a wet-chemical pretreatment process in which a can cylinder is first brought into contact with an acidic aqueous composition which contains water-soluble inorganic compounds of the elements Zr, Ti, Si, Hf, or Ce and water-soluble polymers having carboxyl groups or hydroxyl groups, and subsequently with an aqueous dispersion of a wax. In this manner, the can cylinders are endowed with the sliding and shaping properties required for the other method steps of the can production process, and an excellent adhesive base for a coat is additionally provided. Both the outer and inner surfaces of metallic can cylinders can be pretreated in the process according to the invention. In addition, the invention relates to an acidic aqueous composition that is particularly suitable in the pretreatment process and contains water-soluble polymers selected from condensation products of glycoluril and aldehydes. In addition, a production process for can cylinders comprising the pretreatment according to the invention is described.

Cans of tinned steel (tinplate), of aluminum (or of aluminum alloys, which are combined under the term "aluminum" below for the sake of simplicity), and of steel are widely used for the storage of food and particularly beverages. In the process of producing cans, after the can sheet metal has been deep-drawn to form a can cylinder, the cans are typically degreased, washed, and usually pretreated in an anti-corrosive manner, for which purpose, for example, acidic or alkaline cleaning agents and passivating solutions commercially available. At least the cleaning agent solutions must have sufficient dissolving power for the metals in question in order to effectively remove metal residues from the cans. Due to the cleaning etching attack, the can surface usually has already been roughened so much that even with subsequent anti-corrosive pretreatment by means of passivating solutions, a certain surface roughness remains. This roughness of the outer circumferential surface of the cylindrical cans leads to increased friction between mutually contacting cans and between cans and devices for receiving and further shaping the can cylinders. This friction, during the transfer of the cans from one production step to the next, regularly causes losses in transport and processing speed, e.g., by downtimes especially in places where a backlog of cans has formed due to separation of the cans, or by slowing down the processes of receiving and shaping the can cylinders in the subsequent process steps up until the completion of the beverage can. Because the capacity of the production line is thereby reduced, efforts are being made to condition the can surfaces so as to lower as much as possible the friction between mutually contacting cans.

To this end, the can cylinders are provided with a friction-reducing coating, which typically is applied in a conditioning flushing process that follows the anti-corrosive pretreatment. In this flushing step, the can cylinder is wetted with a usually aqueous solution of special surfactants and/or organic substances that increase the sliding properties of the metal surface. Such substances are referred to as "mobility enhancers" in the prior art of can production. The pretreatment of the can sheet metal having been deep-drawn to form the can cylinder therefore typically encompasses a plurality of wet-chemical treatment steps, so that in addition to the degreasing or cleaning and anti-corrosive pretreatment, the outer circumferential surface of the can cylinders also undergoes a surface conditioning by means of a flushing process involving "mobility enhancers".

The application of a friction-reducing layer must not, however, adversely affect the adhesion of coatings, markings, or other such surface coatings that are applied to protect against corrosion and/or for decorative reasons. In particular, upon drawing ("necking") and subsequent shaping of the cylinder rim to form a flange, there must be no damage to the coating due to poor coat adhesion. In precisely this shaping process, however, chipping off of the coat is often observed, such that can cylinders that have been damaged in this manner need to be sorted out.

U.S. Pat. No. 4,859,351 describes one such surface conditioning of metallic cans in order to reduce the frictional resistance, which contains water-soluble organic ethoxylated phosphate esters, alcohols, and/or fatty acids that are distinguished by the compatibility thereof with a subsequent coating.

U.S. Pat. No. 6,040,280 also discloses a surface conditioning based on ethoxylated fatty acid esters and polyoxyalkylene ethers for aluminum cans, which does not adversely affect the subsequent coating and directly follows a chromium-based conversion treatment.

Furthermore, in the surface treatment and coating of the can cylinders, it must be ensured that the requirements pertaining to corrosion resistance, which vary depending on the material with which the cans are to be filled, are fulfilled. Only active agents are supposed to be used that are generally harmless ecologically and in particular in terms of the food industry. This relates to the selection of the active components in the surface treatment, in much the same way as the selection of the binder in the outer and inner coating of the can cylinders, irrespective of whether technically only the treatment of the outer can surfaces is intended, since this is often done for reasons of production technique in a spraying process in which part of the material cannot be prevented from reaching into the interior of the can cylinder.

In the prior art, a variety of chromium-free processes for anti-corrosive pretreatment of metallic cans are known, which often use inorganic acids, especially phosphoric acid, hydrofluoric acid, or other sources for fluoride and/or complex fluorides, and which work with or without additional use of organic polymers.

For example, U.S. Pat. No. 4,992,116 describes an aqueous acidic treatment solution containing phosphate, a fluoroacid of Zr, Ti, Hf, or Si, and a polyphenol compound, which constitutes a Mannich adduct of a substituted amine to a polyalkenyl phenol or a tannin.

Patent document EP-B-8942 discloses treatment solutions, preferably for aluminum cans, that contain a) 0.5 to 10 g/L of polyacrylic acid or an ester thereof, and b) 0.2 to 8 g/L of at least one of the compounds hexafluorozirconic acid, hexafluorotitanic acid or hexafluorosilicic acid.

The present invention addresses the problem of providing a process for surface-treating metallic cans, which possesses an improved performance spectrum with regard to the aforementioned various requirements. In particular, the sliding and shaping behavior of the can sheet metal, which is deep-drawn to form the can cylinder, is to be further improved, and at the same time an excellent anti-corrosive adhesive base for a protective coating is to be provided.

This problem is solved by a multi-stage process for surface-treating a can cylinder which is deep-drawn from a metal sheet and is open at one end, in which process at least the outer circumferential surface of the can cylinder is brought into contact
  (i) with an acidic aqueous composition containing
    a) at least one water-soluble inorganic compound of the elements Zr, Ti, Si, Hf, and/or Ce; and
    b) at least one water-soluble organic polymer which comprises at least carboxyl groups or hydroxyl groups, the sum of the acid value and/or hydroxyl value being at least 50 mg KOH/g;
and subsequently—with or without an intermediate flushing step—
  (ii) with an aqueous dispersion of a wax.

An inorganic compound is water-soluble in the sense of the present invention if it is possible to dissolve 50g of the inorganic compound at a temperature of 20° C. in one kilogram of water with a pH value of 3, without the formation of an insoluble solid substance in the aqueous phase.

An organic polymer is water-soluble in the sense of the present invention if it is possible to dissolve 10 g of the polymer at a temperature of 20° C. in one kilogram of water with a pH value of 3, and a clear solution remains present. A clear solution is present if the turbidity value (NTU) as measured according to DIN ISO 7027 at a wavelength of 860 nm by light-scattering at a solution temperature of 20° C. lies below a value of 50.

The acid value is, according to the invention, a measured variable to be determined experimentally, which is a measure of the number of free acid groups in the polymer or in a polymer mixture. The acid value is determined by dissolving a weighed amount of the polymer or polymer mixture in a solvent mixture of methanol and distilled water at a volume ratio of 3:1, and subsequently potentiometrically titrating with 0.05 mol/L KOH in methanol. The potentiometric measurement is done with a combination electrode (LL-Solvotrode® from Metrohm; reference electrolyte: 0.4 mol/L tetraethylammonium bromide in ethylene glycol). The acid value corresponds here to the added amount of KOH per gram of polymer or polymer mixture at the inflection point of the potentiometric titration curve.

Analogously, according to the invention, the hydroxyl value can be determined experimentally, by potentiometric titration, as a measure of the number of free hydroxyl groups in the polymer or in a polymer mixture. For this purpose, a weighed amount of the polymer or polymer mixture is heated in a reaction solution of 0.1 mol/L of phthalic anhydride in pyridine at 130° C. for 45 minutes, and next mixed with 1.5 times the volume of the reaction solution in pyridine and subsequently with 1.5 times the volume of the reaction solution in deionized water ($\kappa$<1 $\mu$Scm$^{-1}$). The released amount of phthalic acid is titrated in this mixture by means of 1 M sodium hydroxide. The potentiometric measurement is done with a combination electrode (LL-Solvotrode® from Metrohm; reference electrolyte: 0.4 mol/L tetraethylammonium bromide in ethylene glycol). The hydroxyl value corresponds here to the added amount of NaOH per gram of polymer or polymer mixture at the inflection point of the potentiometric titration curve.

A flushing step in the sense of the present invention, unless otherwise specified, serves solely to remove a wet film adhered to the can surface that contains the active components from a previous wet-chemical treatment step. A flushing step is therefore preferably performed with water, wherein the flushing water preferably has a drying residue of less than 1 g/L, particularly preferably less than 100 ppm, especially preferably less than 10 ppm.

A wax in the sense of the present invention refers to organic substances that are kneadable and solid to brittle hard at 20° C., have a coarse to finely crystalline structure, are color-translucent to opaque but not glass-like, melt above 40° without decomposition, are slightly liquid (low-viscosity) at slightly above the melting point, have a strongly temperature-dependent consistency and solubility, and are polishable under slight pressure. An organic substance is not a wax if more than one of the properties mentioned above is not fulfilled.

The process according to the invention first brings about a good adhesion of the waxes that are applied to the surface of the can cylinder in the second obligatory step of the process. The adhesion of the waxes is such that no significant abrasion of the wax layer is observed in flushing steps, downstream in the process according to the invention, that take place before the application of the can coat. The good adhesion of the waxes in turn increases the mobility of the can cylinders in industrial can production, especially at the end of individual production steps, because the friction of mutually contacting circumferential surfaces of the can cylinders is significantly reduced so that high transport speeds, and consequently also high production speeds, can be ensured.

Moreover, after the application of a can coat, the shaping behavior of can cylinders treated according to the invention is improved, wherein chipping off of the coat in the tapering of the can diameter at the upper end ("necking") and after shaping the upper end to form a flange occurs less frequently and to a much lesser extent.

The process according to the invention is therefore especially advantageous for shaping in the rim region at the open end of the can cylinder, encompassing each such shaping that is directly necessary for the preparation of a connection of the can cylinder to a sealing cap, e.g., the drawing-in of the open end of the can cylinder in order to taper the diameter of the can cylinder in the rim region ("necking") and/or the shaping of the can cylinder to form a flange.

Processes preferable according to the invention are those where the content of water-soluble inorganic compounds of the elements Zr, Ti, Si, Hf, and/or Ce falling under the component a) in the acidic aqueous composition in step (i) is in the range of 0.01 to 1 g/L with respect to the total content of the aforementioned elements, wherein the amount of water-soluble inorganic compounds of the elements Zr and/or Ti preferably is at least 0.01 g/L, particularly preferably at least 0.02 g/L with respect to the total content of the elements Zr and Ti.

In this context, it is further preferable for the water-soluble compounds falling under the component a) of the acidic aqueous composition in step (i) of the process according to the invention to be selected from fluoro complexes of the elements Zr, Ti, and/or Si, particularly preferably from fluoro complexes of the elements Zr and/or Ti.

In the sense of the present invention, fluoro complexes refer to complexes with the corresponding aforementioned metallic or semi-metallic elements, which comprise at least one fluorine atom as ligand and are present as anions in an aqueous solution.

The proportion of the organic resins to be used in step (i) in the process according to the invention, falling under the component b), is preferably in the range of 0.1 to 50 g/L, particularly preferably in the range of 0.5 to 10 g/L in the acidic aqueous composition.

The water-soluble organic resin to be used in the process according to the invention, falling under the component b), of the acidic aqueous composition in step (i) is preferably selected from polymers or copolymers based on vinyl ethers, vinyl alcohols, (meth)acrylic acid, maleic acid, or fumaric acid, from hydroxyl group-containing polyesters, and from condensation products of glycoluril or melamine with aldehydes; particularly preferable are organic resins that constitute the condensation products of glycoluril or melamine with aldehydes, especially condensation products of glycoluril with aldehydes having a hydroxyl value of preferably at least 50 mg KOH/g. The degree of alkylation of the condensation products of glycoluril or melamine with aldehydes is here preferably below 20%, particularly preferably below 10%. Regarding the aforementioned condensation products, primary aldehydes are preferred, especially acetaldehyde and formaldehyde.

It is further preferable for the acidic aqueous composition in step (i) of the process according to the invention to further contain phosphate ions, preferably in an amount of at least 0.1 g/L. The use of phosphates improves the anti-corrosive properties of the conversion layer formed in step (i). For reasons of economic efficiency of the process and in order to avoid phosphate sludge, the proportion of phosphate ions preferably does not exceed 10 g/L.

The pH value of the acidic aqueous composition in step (i) is, in the process according to the invention, preferably not less than 2, particularly preferably not less than 3, and preferably not greater than 6, particularly preferably not greater than 5.

In the process according to the invention, the can cylinder that is open at one end is brought into contact with an aqueous dispersion of a wax in step (ii) in order to ensure adequate sliding properties of the outer circumferential surfaces of the can cylinder upon contact with other cans or with receiving tools in the can production process. The wax used therefor is preferably selected from synthetic waxes, particularly preferably from oxidized polyalkylene waxes, especially preferably from oxidized polyethylene waxes, wherein the content of waxes in the aqueous dispersion in step (ii) is preferably at least 0.1 g/L, particularly preferably at least 1 g/L, in order to guarantee that an adequate amount of the wax can gather on the surfaces of the can cylinder pretreated according to step (i). For reasons of economic efficiency of the process according to the invention, the proportion of waxes in the aqueous dispersion in step (ii) is preferably no greater than 50 g/L, particularly preferably no greater than 10 g/L.

Step (ii) of the process according to the invention is typically followed by further wet-chemical treatment steps which ultimately comprise the coating of the can cylinder with a can coat. In the application of the can coat, a distinction is made in can production between inner and outer coats. The process according to the invention provides a suitable coat adhesion-promoting and anti-corrosive pretreatment for the application of both outer and inner coats.

In a preferred process according to the invention, therefore, at least the outer circumferential surface of the can cylinder that is open at one end is provided with a protective coat after being brought into contact with the aqueous composition in step (ii) and optionally after a flushing step directly following step (ii).

Because inner coats of cans often are in contact with food, the coating of the inner surfaces of cans have special requirements. In the prior art, for example, there has been an abandonment of the use of bisphenol A-based epoxy resins as an inner coat of cans. There are thus underway a variety of national legislative initiatives, driven in part by the EU Directive 2002/72/EU, to establish maximum limits for the migration of bisphenol A from outer packaging into food.

Since, in the application of a coat onto the outer surfaces of cans, it is impossible in terms of process engineering to completely prevent the mostly sprayed-on coat from reaching into the can interior, coats that are suitable for food are preferably used for the coating on the exterior of the can, as well.

It has now been ascertained that the process according to the invention is also particularly suitable for such protective coats that have binders based on acrylic resins and polyester resins.

In a preferred process according to the invention for surface-treating deep-drawn can cylinders, therefore, at least the outer circumferential surface of the can cylinder, which is open at one end, is provided with such protective coats that have binders selected from acrylic resins and/or polyester resins, wherein the acrylic resins are preferably composed of copolymers of alkenes, in particular ethene, propene, 1-butene, 2-butene, isobutene, 1,3-butadiene, and/or 2-methylbuta-1,3-diene, and $\alpha,\beta$-unsaturated carboxylic acids, in particular cinnamic acid, crotonic acid, fumaric acid, itaconic acid, maleic acid, acrylic acid, and/or methacrylic acid.

The bringing into contact of the respective aqueous compositions in steps (i) and (ii) and the application of the protective coat are, in processes according to the invention, preferably carried out by spraying-on, e.g., in an airless process.

In the so-called airless process, the respective liquids are airlessly atomized and thus applied onto the material surface. In these spraying processes, a predetermined amount of the liquid is applied by means of spray guns, while the can rotates about the longitudinal axis thereof in order to form a homogenous wet film.

After the wet film has been applied for coating with a protective coat, the can cylinders treated in this manner, which are open at one end, are preferably cured at temperatures in the range of 120 to 200° C. (object temperature) to form a coat film.

In the further course of can production, the can cylinders, that are open at one end, pretreated in a wet-chemical manner in such a process according to the invention and provided with a protective coat, are usually shaped in the rim region open at one end, including in particular being drawn-in in the rim region in order to taper the diameter of the can cylinder ("necking") and being shaped to form a flange.

The improved shaping behavior of the can cylinders, imparted due to the process according to the invention in addition to the corrosion protection, the coat adhesion, and the low coefficient of sliding friction, is therefore technically only used if the aforementioned shaping process follows the wet-chemical pretreatment according to process steps (i) and (ii).

The process for surface treatment according to the invention is consequently preferably wherein process steps (i) and (ii) and an optionally subsequent step for applying a protective coat are performed only on those can cylinders that are open at one end which are not shaped in the end region that is open at one end, and especially are neither drawn-in to taper the diameter of the can cylinder nor shaped to form a flange there.

The can cylinders open at one end that are used in the process for surface treatment according to the invention are preferably deep-drawn from tinplate, steel sheet, or aluminum sheet.

The present invention furthermore encompasses a particularly suitable acidic aqueous composition for wet-chemical pretreatment falling under process step (i) of the process according to the invention for surface treatment of can cylinders that are open at one end.

One such acidic aqueous composition for surface-treating metallic cans according to the invention has a pH value in the range of 2 to 5 and contains
- a) 0.005 to 0.5 wt. %, preferably 0.01 to 0.1 wt. %, fluoro complexes of the elements Zr, Ti, and/or Si, with respect to the respective elements; and
- b) 0.05 to 3 wt. %, preferably 0.1 to 2 wt. %, water-soluble resins selected from condensation products of glycoluril with aldehydes, wherein the condensation product preferably has a hydroxyl value of at least 50 mg KOH/g and the degree of alkylation of the condensation product is preferably less than 20%.

Primary aldehydes, in particular acetaldehyde and formaldehyde, are preferred for the condensation product.

The acidic aqueous composition according to the invention preferably contains less than 0.1 wt. % organic polymers from the group of epoxides, urethanes, and polyesters, preferably less than 0.1 wt. % those organic polymers that do not constitute condensation products of glycoluril with aldehydes.

The present invention relates also to a production process for can cylinders, in which
- A. a circular blank of a metal sheet is deep-drawn to form a can cylinder that is open at one end;
- B. the can cylinder that is open at one end is wet-chemically pretreated and subsequently is coated, wherein in the wet-chemical pretreatment, at least the outer circumferential surface of the can cylinder is brought into contact
  - (i) with an acidic aqueous composition containing
    - a) at least one water-soluble inorganic compound of the elements Zr, Ti, Si, Hf, and/or Ce; and
    - b) at least one water-soluble organic polymer which comprises at least carboxyl groups or hydroxyl groups, the sum of the acid value and/or hydroxyl value being at least 50 mg KOH/g;
  and subsequently—with or without an intermediate flushing step—
  - (ii) with an aqueous dispersion of a wax; and
- C. the wet-chemically pretreated and coated can cylinder is drawn-in in the rim region that is open at one end in order to taper the diameter of the can cylinder and/or is shaped to form a flange in the rim region that is open at one end.

The deep-drawing of the circular blank to form the can cylinder that is open at one end is followed preferably by a cleaning step to remove metal working fluids.

The same preferred embodiments as were described above for the process for surface treatment according to the invention also apply to the wet-chemical pretreatment used for can cylinders in the production process according to the invention, and the subsequent coating with a protective coat. The same also applies to the methods for the bringing into contact of the compositions in the pretreatment, the coating of the can cylinders, and the material selection of the metal sheets.

Embodiments:

An acidic aqueous treatment solution having the following composition was used as a base formulation for the pretreatment of aluminum cans (EN AW-3104):
- 50 ppm Zr from $H_2ZrF_6$
- 40 ppm B from boric acid
- 80 ppm $PO_4$ from phosphoric acid
- 300 ppm $NO_3$ from nitric acid
- 25 ppm free fluoride (measured with an ion-selective electrode)
- pH value 3.2

A first step entails a conversion treatment of the outer surfaces of the cans with the aforementioned treatment solution, which additionally contains an organic polymer. The following organic polymers were used in such a conversion treatment:

Org1: tetramethylol glycoluril resin (hydroxyl value 450 to 480 mg KOH/g)

Org2: maleic acid-methyl vinyl ether copolymer (acid value 220 to 280 mg KOH/g)

Org3: polyacrylic acid

The outer surfaces of the aluminum cans were thus initially sprayed with the treatment solutions set forth in table 1, subsequently flushed with deionized water ($\kappa < 1\mu Scm^{-1}$), and then, in a second step, sprayed with an aqueous solution containing 7 g/L of an emulsified, non-ionogenic, oxidized polyethylene wax, immediately thereafter flushed again with deionized water ($\kappa < 1\mu Scm^{-1}$), and subsequently dried at 60° C. object temperature.

TABLE 1

Formulations for surface treatment of aluminum cans

| | Polymer in g/L | | | Coating layer[1] of Zr |
|---|---|---|---|---|
| Example no. | Org1 | Org2 | Org3 | mg/m² |
| V1 | — | — | — | 19 |
| E1 | 6 | — | — | 20 |
| E2 | — | 6 | — | 22 |
| E3 | — | — | 6 | 19 |

[1]measured by X-ray fluorescence analysis (XRF)

The properties of the outer can surfaces that were pretreated in accordance with the two-stage process described above have been determined in table 2 as regards the sliding behavior and coat adhesion.

The sliding behavior was determined by stacking three cans in the form of a triangle, wherein the lower two cans that formed the base were raised at one end vertically to the longitudinal direction of the cans. In the one-sided raising of the can stack, the angle between the can axis and the horizontal is indicated as the "slip angle" at which the upper can began to slip. This test was repeated five times with different but similarly pretreated cans, and the mean value of each of the determined "slip angles" was established.

After the executed outer coating of the pretreated cans with a commercially available can coat (coat base: acrylate-modified polyester from DSM, Uradil® SZ250; layer thickness about 15 μm) and after the tapering or compression of the open can rim ("necking") and 90° flanging of the can rim, the coat adhesion was determined. The assessment was carried out visually in the shaping region of the can, in five-can increments, according to the following criteria:
- 1: No visible cracks or chipping of the coat
- 2: Cracks and slight chipping of the coat
- 3: Severe chipping of the coat

TABLE 2

Sliding behavior and coat adhesion of the outer can surfaces pretreated according to table 1

| Example no. | Slip angle | Coat adhesion |
|---|---|---|
| V1 | 33 | 3 |
| E1 | 22 | 1 |
| E2 | 25 | 1-2 |
| E3 | 26 | 1-2 |

The results show that in the two-stage process for surface treatment according to the invention, especially with compositions that contain the glycoluril resin in the first step (E1), the lowest slip angles and best coat adhesion are obtained (E1-E3).

The invention claimed is:

1. A process for surface-treating a can cylinder which is deep-drawn from a metal sheet and is open at one end, comprising steps of:
   (i) contacting at least an outer circumferential surface of a can cylinder that is open at one end, wherein the can cylinder is not shaped in a rim region that is open at one end, with an acidic aqueous composition containing:
      a) at least one water-soluble inorganic compound of an element selected from Zr, Ti, Si, Hf, Ce and combinations thereof; present in an amount in a range of 0.01 to 1 g/L with respect to a total content of said elements; wherein water-soluble inorganic compounds of Zr and/or Ti are present in an amount of at least 0.01 g/L, with respect to total content of the elements Zr and Ti; and
      b) at least one water-soluble organic resin, which comprises at least carboxyl groups or hydroxyl groups, having an acid value and/or a hydroxyl value wherein a sum of the acid value and/or hydroxyl value of the at least one water-soluble organic resin is at least 50 mg KOH/g, wherein the at least one water-soluble organic resin of component b) is in present in an amount in a range of 0.1 to 50 g/L;
   wherein the acidic aqueous composition has a pH value of not less than 2 and not greater than 6; and subsequently—with or without an intermediate flushing step—
   (ii) contacting at least the outer circumferential surface of the can cylinder from step (i) with an aqueous dispersion of a wax.

2. The process according to claim 1, wherein the water-soluble compounds of component a) of the acidic aqueous composition in step (i) are selected from fluoro complexes of the elements Zr, Ti, and/or Si.

3. The process according to claim 1, wherein the water-soluble organic resin falling under component b) of the acidic aqueous composition in step (i) is selected from polymers or copolymers based on vinyl ethers, vinyl alcohols, (meth)acrylic acid, maleic acid, or fumaric acid, from hydroxyl group-containing polyesters, and from condensation products of glycoluril or melamine with aldehydes.

4. The process according to claim 1, wherein the acidic aqueous composition in step (i) additionally contains phosphate ions in an amount of at least 0.1 g/L, but not more than 10 g/L.

5. The process according to claim 1, wherein the wax in the aqueous dispersion in step (ii) is selected from synthetic waxes present in the aqueous dispersion in a range of 0.1 to 50 g/L.

6. The process according to claim 1, wherein steps (i) and (ii) is in each case carried out by spraying-on.

7. The process according to claim 1, further comprising steps:
   (iii) providing at least the outer circumferential surface of the can cylinder that is open at one end with a protective coat after step (ii) and optionally after a flushing step that directly follows step (ii); and
   (iv) necking and/or flanging the rim region that is open at one end.

8. The process according to claim 7, wherein said protective coat comprises binders selected from the group consisting of acrylic resins, polyester resins, and combinations thereof, and does not contain bisphenol A-based epoxy resins.

9. The process according to claim 8, wherein the acrylic resins are selected from copolymers of alkenes and α,β-unsaturated carboxylic acids.

10. The process according to claim 9, wherein the alkenes are selected from ethene, propene, 1-butene, 2-butene, isobutene, 1,3-butadiene, and/or 2-methylbuta-1,3-diene; and the α,β-unsaturated carboxylic acids are selected from cinnamic acid, crotonic acid, fumaric acid, itaconic acid, maleic acid, acrylic acid, and/or methacrylic acid.

11. The process according to claim 1, wherein the can cylinder is deep-drawn from tinplate, steel sheet, or aluminum sheet.

12. A production process for can cylinders, in which
   A. a circular blank of a metal sheet is deep-drawn to form a can cylinder that is open at one end;
   B. the can cylinder that is open at one end is pretreated and coated in a process comprising steps of:
      (i) spraying at least an outer circumferential surface of the can cylinder that is open at one end with an acidic aqueous composition containing:
         a) at least one water-soluble inorganic compound of an element selected from Zr, Ti, Si, Hf, Ce and combinations thereof; present in an amount in a range of 0.01 to 1 g/L with respect to a total content of said elements; wherein water-soluble inorganic compounds of Zr and/or Ti are present in an amount of at least 0.01 g/L, with respect to total content of the elements Zr and Ti; and
         b) at least one water-soluble organic resin, which comprises at least carboxyl groups or hydroxyl groups, having an acid value and/or a hydroxyl value wherein a sum of the acid value and/or hydroxyl value of the at least one water-soluble organic resin is at least 50 mg KOH/g, wherein the at least one water-soluble organic resin of component b) is in present in an amount in a range of 0.5 to 10 g/L;
      wherein the acidic aqueous composition has a pH value of not less than 3 and not greater than 5; and subsequently—with or without an intermediate flushing step—
      (ii) spraying at least the outer circumferential surface of the can cylinder from step (i) with an aqueous dispersion consisting essentially of a wax;
      (iii) spraying at least the outer circumferential surface of the can cylinder from step (ii) with a protective coating to form a pretreated and coated can cylinder; and
   C. the pretreated and coated can cylinder is drawn-in in a rim region that is open at one end in order to taper a diameter of the can cylinder and/or is shaped to form a flange in a rim region that is open at one end.

13. The process according to claim 12, wherein the acidic aqueous composition in step (i) contains less than 0.1 wt. % organic polymers selected from the group consisting of epoxides, urethanes and polyesters.

14. An acidic aqueous composition having a pH value in the range of 2 to 5, for surface-treating metallic cans, comprising:
   a) 0.005 to 0.5 wt. % fluoro complexes of elements Zr, Ti, and/or Si, with respect to the respective elements; and
   b) 0.1 to 3 wt. % water-soluble resins selected from condensation products of glycoluril with aldehydes.

15. The acidic aqueous composition according to claim 14, wherein the condensation product of glycoluril with aldehydes has a hydroxyl value of at least 50 mg KOH/g.

\* \* \* \* \*